3,838,481
METHOD FOR REMOVING COLOR BODIES FROM METHYLNAPHTHALENE SOLUTIONS EMPLOYING PALLADIUM CATALYSTS
Ronald E. Hassall, Midland, Mich., assignor to The Dow Chemical Company, Midland, Mich.
No Drawing. Filed Oct. 2, 1972, Ser. No. 293,827
Int. Cl. C07c 7/00
U.S. Cl. 260—674 N     6 Claims

ABSTRACT OF THE DISCLOSURE

Removal of color, deep blue, in methylnaphthalenes by passing the mixture of methylnaphthalenes through a bed of alumina, then hydrogenating the color bodies, particularly the azulenes, over palladium (preferably supported on alumina) catalyst at 25° to 150° C. for 1 to 3.5 hours and pressures of 30 to 100 p.s.i.g. A light brown, light yellow or colorless product is obtained. The slightly colored product, upon distillation, yields a colorless distillate.

BACKGROUND OF THE INVENTION

Various commercially obtained mixtures of methylnaphthalenes are employed as dye carriers. In most methylnaphthalene mixtures, and particularly those obtained principally as distillation fractions boiling in the 240° to 260° C. range from the heavier and higher boiling aromatics, the major color body is a group of aromatic-like chemical compounds having the general srtucture:

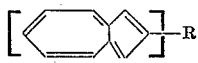

wherein R represents alkyl radicals of 1 to 4 or more carbon atoms, known as azulenes.

The art is knowledgeable of the intense blue color of the azulenes and has suggested several techniques for chemically altering or physically removing the azulenes, as for example, hydrogenation over palladium catalyst (Kremers, R. E., Journal American Chemical Society, Vol. 45 page 717 (1923)), phosphoric acid extraction (Sherndal, H. E. JACS, 37, 167 (1915)), and thermal isomerization (Heilbronner, E., Plattner, P. A., and Wieland, K., Experienta, 3, 70 (1947)). None of these procedures was satisfactory for a commerical process, as for example, while palladium is a good hydrogenation catalyst for the azulenes, etc., it does hydrogenate the methylnaphthalenes to varying degrees, an undesirable result. Further, attempts to hydrogenate plant grade methylnaphthalene mixtures results in poisoning of the catalytic activity of the palladium.

In a search to find a commercial process for removing the color from the methylnaphthalene mixture, several additional techniques were tried, among which were hydrogenation over platinum on carbon, fractional distillation, adsorption over silica gel, alumina, activated carbon, and filtrol clays, the latter technique, absorption, having some effect but insufficient to satisfy the dye industry as to color. Deils-Adler adduct formation and oxidation also failed to yield commercially acceptable products.

BRIEF DESCRIPTION OF THE INVENTION

In accordance with the present invention, a mixture of methylnaphthalenes commercially produced during petrochemical refining can be color improved by treating the mixture by passing it through a bed of alumina, then hydrogenating the so-treated mixture over a palladium, preferably 0.2 to 1.0% by weight palladium on alumina, catalyst at 25° to 150° C. for 1 to 3.5 hours under 30 to 100 p.s.i.g. without reducing the methylnaphthalene concentration. In some instances if color still remains, the hydrogenated mixture may be vacuum distilled in a single plate still, resulting in a nearly colorless product.

The physical state of the catalyst does not appear to be critical; however, a 0.2 to 1% by weight palladium on alumina has given as good results in a stirred batch reactor.

The procedure of the present invention is suitable for hydrogenating azulenes present in methylnaphthalene rich streams without material hydrogenation of the methylnaphthalenes or other aromatic constituents normally found associated with methylnaphthalenes in refinery streams.

DETAILED DESCRIPTION OF THE INVENTION

Example 1

A methylnaphthalene stream obtained from a mixture boiling in the range of 245°–255° C. had the following composition:

|  | Wt. percent |
|---|---|
| $C_{4-8}$ | 1.15 |
| Azulene | 0.03 |
| $C_{11}$ Aromatic | 1.17 |
| Naphthalene | 0.25 |
| Ethylidenes | 0.50 |
| Dimethylidenes | 1.46 |
| 2-Methylnaphthalene | 48.11 |
| 1-Methylnaphthalene | 42.57 |
| Biphenyl | 2.94 |
| Methylbiphenyl | 0.12 |
| 2-Ethylnaphthalene | 0.08 |
| $C_{12}$ Aromatic | 1.61 |
| 2,6-Dimethylnaphthalene | 0.02 | was treated by passing the mixture through a bed of followed by hydrogenation in a stirred pressure reaction vessel. The catalyst was either 0.3 or 0.5 weight percent palladium on alumina. The hydrogen pressure, time and reaction temperature are set forth in the table below for several runs made with 100 gram samples pretreated over alumina.

| Run | Percent catalyst on alumina, g. catalyst/100 g. mixture | $H_2$, p.s.i.g. | T., °C. | Time, hours | Color |
|---|---|---|---|---|---|
| 1 | .3/1.5 | 34.2 | 135 | 3.5 | Color removed. |
| 2 | .3/1.5 | 36 | 135 | 3.5 | Pale yellow. |
| 3 | .3/1.5 | 33 | 135 | 3.5 | Do. |
| 4 | .3/10 | 33 | 40/135 | 0.66/0.75 | Pale green. |
| 5 | .3/10 | 34 | 100 | 1 | Do. |
| 6 | .3/5 | 33 | 125 | 1.5 | Light yellow. |

In a comparative run, a sample of the same mixture was not passed over alumina, but was hydrogenated with 1.2 grams of 0.3 weight percent palladium on alumina at 33.2 p.s.i.g. hydrogen at 135° C. for 60 hours. No color change was observed.

I claim:

1. A method for removing azulene color from a 240° to 260° C. boiling range petroleum fraction which comprises treating the fraction by passing it through an alumina bed followed by selective hydrogenation of the so-treated azulene color containing petroleum fraction over a palladium catalyst at 25° to 150° C. under a hydrogen pressure of 30 to 100 p.s.i.g. for 1 to 3.5 hours and recovering a fraction substantially devoid of said azulene color.

2. The method of Claim 1 wherein the hydrogenated product is vacuum distilled thereby producing a substantially colorless product.

3. A method for removing azulene color from a methylnaphthalene rich 240°–260° C. boiling range petroleum fraction which comprises treating the fraction by passing it through a bed of alumina followed by selective hydrogenation of the so-treated azulene color containing petroleum fraction over a 0.2 to 1.0 palladium on alumina catalyst at 25° to about 150° C. under a hydrogen pressure of 30 to 100 p.s.i.g. for 1 to 3.5 hours and recovering a fraction substantially devoid of said azulene color.

4. The method of Claim 3 wherein the hydrogenated product is vacuum distilled thereby producing a substantially colorless product.

5. The process of Claim 3 wherein the catalyst was present in 0.3% palladium on alumina and is present in a weight ratio of fraction of from 1 to 10 percent.

6. The process of Claim 3 wherein the catalyst was present in 0.5% palladium on alumina and is present in a weight ratio of fraction of from 1 to 10 percent.

References Cited

UNITED STATES PATENTS

| | | | |
|---|---|---|---|
| 2,183,405 | 12/1939 | Olin | 208—264 |
| 2,116,061 | 5/1938 | Dorrer | 208—264 |
| 1,800,159 | 4/1931 | Schroeter | 260—674 |
| 3,663,637 | 5/1972 | Juhl et al. | 260—674 |
| 3,277,199 | 10/1966 | Poll | 260—674 |

DELBERT E. GANTZ, Primary Examiner

C. E. SPRESSER, JR., Assistant Examiner

U.S. Cl. X.R.

208—264; 260—674 H

PO-1050
(5/69)

UNITED STATES PATENT OFFICE
CERTIFICATE OF CORRECTION

Patent No. 3,839,481            Dated October 1, 1974

Inventor(s) Ronald E. Hassall

It is certified that error appears in the above-identified patent and that said Letters Patent are hereby corrected as shown below:

Col. 1, line 57, delete "asborption" and insert --absorption--

Col. 2, line 34, after the word "of" insert --alumina--

Signed and sealed this 1st day of April 1975.

(SEAL)
Attest:

RUTH C. MASON
Attesting Officer

C. MARSHALL DANN
Commissioner of Patents
and Trademarks